Patented Apr. 25, 1933

1,905,850

UNITED STATES PATENT OFFICE

JOHN J. GREBE AND SYLVIA M. STOESSER, OF MIDLAND, MICHIGAN, ASSIGNORS TO THE DOW CHEMICAL COMPANY, OF MIDLAND, MICHIGAN, A CORPORATION OF MICHIGAN

SYNTHETIC LUBRICANT AND METHOD OF MAKING SAME

No Drawing.   Application filed April 25, 1930.   Serial No. 447,408.

The present invention relates to methods for the thermal treatment of aromatic ethers and mixtures thereof with aromatic hydrocarbons and other oxygenated aromatic compounds whereby oleaginous products are formed possessing marked stability at elevated temperatures and also excellent lubricating properties. The invention, then, consists of the method and new products hereinafter fully described and pointed out in the claims, the following description setting forth various ways in which the principle of the invention may be used.

A typical aromatic ether suitable as raw material for the preparation of our new products is phenyl ether or diphenyl oxide, $C_6H_5.O.C_6H_5$. We have found that when diphenyl oxide is heated at atmospheric or higher pressure to a temperature between about 400° and 800° C. and maintained at such temperature for a sufficient length of time, depending upon the actual temperature employed, it undergoes a partial conversion to form a complex mixture of compounds having a higher boiling point and a higher average molecular weight than the starting material. Such mixture or mixtures are oils similar in appearance to oils derived from a petroleum base, but differentiating therefrom in various important respects, such as specific gravity, ability to withstand high temperatures without decomposing, behavior when subjected to chemical tests, etc.

The rate of conversion of diphenyl oxide to the higher boiling compounds is dependent upon the temperature at which it is treated. For instance, when heated for 7 days at a temperature of 400° to 450° C. the conversion to the higher boiling oil was only about 2 per cent. At higher temperatures, however, the ratio is initially increased enormously e. g. to as much as 15 per cent. conversion in 3 minutes at 650° to 700° C., but the accumulation of conversion product in the mixture appears to limit further change upon continued heating after about 15 per cent. of product has been formed. If the unaltered material remaining is distilled off, however, and then subjected to the same thermal treatment, a further conversion up to about 15 per cent. may be effected and the process repeated until the larger part of the original material has been transformed to the desired high boiling oil. By the exhaustive heat treatment of diphenyl oxide at about 700° C. as much as 75 per cent. yield of oil may be obtained, accompanied by approximately a 5 per cent. yield of gaseous and easily volatile products, and a 20 per cent. yield of tarry residue.

The upper temperature limit for the conversion is determined by the temperature at which decomposition accompanied by evolution of hydrogen becomes perceptible, such temperature of incipient decomposition being apparently around 750° to 800° C. Pressure is not essential for effecting the transformation, which we have found to take place either in liquid or gaseous phase, but in practice the operation may be conveniently carried out under superatmospheric pressure, as by heating in closed tubes, retorts or the like.

A catalyst may be employed to increase the rate of conversion, particularly various metallic oxides, such as $Al_2O_3$, $ThO_2$, $CrO_3$, $CuO$, $MgO$, etc., or mixtures thereof. Good results have been obtained with $Al_2O_3$ or with mixtures of $Al_2O_3$ and $CuO$. For instance, employing as catalyst approximately 2 per cent. of $Al_2O_3$, based upon the weight of diphenyl oxide used, and heating at 400° C., the yield for the same reaction time was increased by 8 times, and with 2 per cent. of a mixture of $Al_2O_3$ and $CuO$ the yield was increased by 13 times over that when no catalyst was used.

The new products or oils are separated by distillation from the mixture resulting from the aforesaid thermal treatment of diphenyl oxide. The lower boiling compounds and unreacted material are first distilled off, and then the higher-boiling fractions constituting our new oils are distilled over, preferably under reduced pressure, the boiling point range thereof being about 200° to 350° C. at 5 to 10 millimeters absolute pressure.

The physical properties of our new oils or of fractions obtained therefrom are approximately as follows:—

Specific gravity _____ 1.12–1.21 at 25° C.
Viscosity at 210° F _____ 40–70 Saybolt sec.
Pour test (average) _____ 50° F.
Refractive index at 25° C. (average) __ 1.654
Dielectric strength __ $25 \times 10^3$ volts per 0.1 inch gap The color is reddish yellow by transmitted light, changing to dark green by reflected light, the oils exhibiting a fluorescence similar to that of paraffin base oils.

The identity and chemical constitution of the compounds comprising our new oils have not been determined. The oils are dissolved on warming with fuming sulphuric acid and are likewise readily soluble in dimethyl sulphate, thus responding to tests indicating them to be composed substantially of aromatic hydrocarbons or oxygenated derivatives thereof. The last named feature particularly distinguishes the oils of the present invention from the oils derived from a petroleum base or produced by synthetic methods from coal or natural bituminous substances. The average molecular weight of the constituents of the oils is in the vicinity of 300 according to the usual methods of determination, although apparently the range of molecular weights of the various components extends from about 250 to 350 or higher.

A representative ultimate analysis of a sample of the oils is as follows:—carbon, 87.12 per cent.; hydrogen, 5.49 per cent.; oxygen (by diff.). 7.34 per cent.; ash, 0.05 per cent. Naturally there will be more or less variation in the analysis of different samples, and the above figures are not to be construed as limiting the invention.

Products similar to the oils herein described may likewise be prepared by subjecting mixtures of diphenyl oxide with aromatic hydrocarbons and oxygenated derivatives thereof to similar thermal treatment in a temperature range between about 400° C. and the decomposition point of such compounds. Among the substances which we have thus employed are both mononuclear and multinuclear hydrocarbons, e. g. benzene, toluene, diphenyl, naphthalene, phenanthrene, fluorene, anthracene, tetralin, etc., and oxygenated derivatives, such as phenol, cresol, diphenylene oxide, and crude mixtures containing phenols, such as creosote oil, etc. Crude fractions from the distillation of coal tar may likewise be used.

A striking property of our new oils is their exceptional stability when exposed to elevated temperatures. For instance, they may be heated repeatedly and for long periods to temperatures as high as 400° C. without material deterioration or modification of their properties. In one test a sample maintained continuously for one week at a temperature of 400° C. showed no carbonization and suffered no loss in body or viscosity. As contrasted thereto samples of good commercial grades of "heavy" motor oil subjected to the same treatment were extensively carbonized and broken down to a consistency much like water so that their lubricating value was completely destroyed. This ability to withstand prolonged exposure to a high degree of heat demonstrates the superiority of the oils for a variety of purposes, such as for the lubrication of Diesel engines, steam engines and all forms of mechanical apparatus operated at bearing temperatures as high as about 400° C. The oils are likewise well adapted for use as a heat transfer medium. Their high dielectric strength, in addition, fits them particularly for use as transformer oils, and for similar applications.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. The method of making oleaginous products which comprises heating diphenyl oxide at a temperature between 400° C. and the decomposition point thereof and separating from the reaction product the fraction distilling between approximately 200° and 350° C. at an absolute pressure of 5 to 10 millimeters.

2. The method of making oleaginous products which comprises heating diphenyl oxide at a temperature between about 650° and 750° C. under pressure due to the vapor pressure of the reaction mixture at the temperature employed and separating from the reaction product the fraction distilling between approximately 200° and 350° C. at an absolute pressure of 5 to 10 millimeters.

3. The method of making oleaginous products which comprises heating diphenyl oxide at a temperature between 400° C. and the decomposition point thereof in the presence of a metallic oxide catalyst and separating from the reaction product the fraction distilling between approximately 200° and 350° C. at an absolute pressure of 5 to 10 millimeters.

4. The method of making oleaginous products which comprises heating diphenyl oxide at a temperature between 400° C. and the decomposition point thereof in the presence of aluminum oxide as catalyst and separating from the reaction product the fraction distilling between approximately 200° and 350° C. at an absolute pressure of 5 to 10 millimeters.

5. The method of making oleaginous products which comprises heating diphenyl oxide at a temperature between 400° C. and the decomposition point thereof in the presence of a catalyst consisting of a mixture of aluminum oxide and cupric oxide and separating from the reaction product the fraction distilling between approximately 200° and 350° C. at an absolute pressure of 5 to 10 millimeters.

6. The method of making oleaginous products which comprises heating a mixture of diphenyl oxide with other compounds included within the group of aromatic hydrocarbons and oxygenated derivatives thereof at a temperature between 400° C. and the decomposition point of the mixture constituents and separating from the reaction product the fraction distilling between approximately 200° and 350° C. at an absolute pressure of 5 to 10 millimeters.

7. The method of making oleaginous products which comprises heating a mixture of diphenyl oxide with other compounds included within the group consisting of aromatic hydrocarbons and oxygenated derivatives thereof at a temperature between about 650° and 750° C. under pressure due to the vapor pressure of the reaction mixture at the temperature employed and separating from the reaction product the fraction distilling between approximately 200° and 350° C. at an absolute pressure of 5 to 10 millimeters.

8. The method of making oleaginous products which comprises heating a mixture of diphenyl oxide with other compounds included in the group of aromatic hydrocarbons and oxygenated derivatives thereof in the presence of a metallic oxide catalyst at a temperature between 400° C. and the decomposition point of the mixture constituents and separating from the reaction product the fraction distilling between approximately 200° and 350° C. at an absolute pressure of 5 to 10 millimeters.

9. An oil comprising the product of the thermal treatment of diphenyl oxide or mixtures of the same with aromatic hydrocarbons and oxygenated derivatives thereof at a temperature between 400° C. and the decomposition point of such compounds, said product having a specific gravity between 1.12 and 1.21 at 25° C. and a viscosity between 40 and 70 sec. Saybolt at 210° F., and being completely soluble on warming with fuming sulphuric acid.

Signed by us this 22 day of April, 1930.

JOHN J. GREBE.
SYLVIA M. STOESSER.

DISCLAIMER 1,905,850.—*John J. Grebe* and *Sylvia M. Stoesser*, Midland, Mich. SYNTHETIC LUBRICANT AND METHOD OF MAKING SAME. Patent dated April 25, 1933. Disclaimer filed February 20, 1936, by the assignee, *The Dow Chemical Company*.

Hereby enters this disclaimer from claims 1, 2, and 9 of said specification.

[*Official Gazette March 10, 1936*]